United States Patent [19]

Ripple

[11] 3,821,236

[45] June 28, 1974

[54] CERTAIN 2-HALO-1,2,4-THIADIAZOLE DISULFIDES

[75] Inventor: David Eugene Ripple, Willoughby Hills, Ohio

[73] Assignee: The Lubrizol Corporation, Wickliffe, Ohio

[22] Filed: May 3, 1972

[21] Appl. No.: 249,806

[52] U.S. Cl. ............................ 260/302 SD, 208/18
[51] Int. Cl. ............................................. C07d 91/60
[58] Field of Search ............................. 260/302 SD

[56] References Cited
UNITED STATES PATENTS

| | | | |
|---|---|---|---|
| 2,719,126 | 9/1955 | Fields et al. ........................ | 260/302 |
| 2,983,716 | 5/1961 | Fields .................................. | 260/302 |
| 3,159,644 | 12/1964 | Stephens ........................... | 260/302 |

Primary Examiner—Richard J. Gallagher
Attorney, Agent, or Firm—James W. Adams, Jr.; William H. Pittman

[57] ABSTRACT

3-Halo-1,2,4-thiadiazolyl 5-disulfides and 1,2,4-thiadiazolyl 3,5-bis(disulfides) are prepared by reaction of mercaptans with the corresponding sulfenyl chlorides. The disulfides are useful as corrosion inhibitors in lubricants.

7 Claims, No Drawings

CERTAIN 2-HALO-1,2,4-THIADIAZOLE DISULFIDES

This invention relates to new compositions of matter which are effective as corrosion inhibitors in lubricants. More particularly, it relates to compounds having the formula

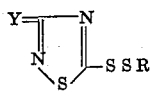

wherein R is a hydrocarbon or substituted hydrocarbon radical and Y is halogen or SSR.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

Methyl
Ethyl
Propyl
Butyl
Hexyl
Octyl
Decyl
Vinyl
Allyl
Ethynyl
Benzyl
Cyclohexyl
Cyclopentyl
Methylcyclopentyl
Cyclopentadienyl
vinylphenyl
Isopropenylphenyl
Cinnamyl
Naphthyl
Propargyl
Phenyl
Tolyl
Xylyl
-C$_6$H$_3$(C$_2$H$_5$)$_2$
-C$_6$H$_4$(CH$_2$)$_{11}$CH$_3$

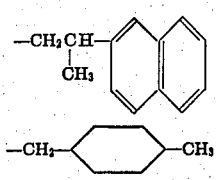

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention.

By "substituted" is meant radicals containing substituents which do not alter significantly the character or reactivity of the radical. Examples are:
Halide (fluoride, chloride, bromide, iodide)
Hydroxy
Ether (especially lower alkoxy)
Ester (especially lower carbalkoxy)
Aminoacyl (amide)
Amino
Nitro
Cyano
Mercapto
Thioether
Sulfoxy
Sulfone
Sulfonic acid ester, amide, etc.

In general, no more than about three such substituent groups will be present for each 10 carbon atoms in the radical.

Preferably, the hydrocarbon or substituted hydrocarbon radicals in the compounds of this invention are free from ethylenic and acetylenic unsaturation and have no more than about 30 carbon atoms, desirably no more than about 12 carbon atoms. A particular preference is expressed for hydrocarbon radicals (usually alkyl radicals) containing at least six carbon atoms.

As previously indicated, Y may be halogen (usually chlorine or bromine and preferably chlorine) or SSR. More often, it is SSR. In that event, the two R radicals may be the same or different but they are usually the same.

The compounds of this invention are prepared by reacting a 1,2,4-thiadiazole sulfenyl chloride with a mercaptan:

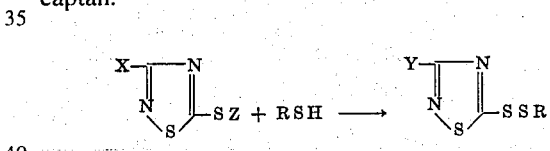

wherein X is halogen or SZ and Z is halogen. The 1,2,4-thiadiazole sulfenyll chloride used as a reactant may be prepared by first reacting cyanamide with carbon disulfide and a base to form the dipotassium salt of dimercaptocyanamide and then reacting said dipotassium salt with two moles of chlorine to yield 3-chloro-1,2,4-thiadiazolyl-5-sulfenyl chloride, or with one mole of sulfur followed by two moles of chlorine to yield 1,2,4-thiadiazolyl-3,5-bis(sulfenyl chloride). reaction is described at *Journal Of Organic Chemistry*, 36, 14 (1971).

The reaction with the mercaptan is conveniently carried out merely by adding the mercaptan to the 1,2,4-thiadiazole sulfenyl chloride, usually at a temperature below about 20°C. and preferably below 0°C. It is usually convenient to employ a non-polar solvent, especially a chlorinated solvent such as methylene chloride, ethylene chloride, chlorobenzene or the like. The course of the reaction may be followed by measuring the hydrogen chloride evolved; when hydrogen chloride evolution has ceased, the reaction may be considered complete. The product may then be isolated by conventional procedures. In most instances, the product is a liquid.

The preparation of the compounds of this invention is illustrated by the following examples. All parts and percentages are by weight.

EXAMPLE 1

A suspension of 150 parts (0.663 mole) of the dipotassium salt of 3,5-dimercapto-1,2,4-thiadiazole in 526 parts of methylene chloride is reacted with 94 parts (1.325 moles) of chlorine at a temperature between −60° and −55°C. To the resulting chlorinated intermediate is added 194 parts (0.663 mole) of t-octyl mercaptan over ½ hour under nitrogen, with stirring. The temperature during the t-octyl mercaptan addition is maintained between −55° and −5°C. The evolved hydrogen chloride is absorbed in a trap containing caustic solution.

When hydrogen chloride evolution has ceased, the methylene chloride is removed by evaporation and the product is dissolved in toluene. The toluene solution is filtered (using a filter aid material) and the toluene is evaporated to yield the desired bis-disulfide which contains 33.57 percent sulfur and 4.05 percent nitrogen.

EXAMPLE 2

The dipotassium salt of dimercaptocyanamide (103 parts, 0.53 mole) is suspended in 987 parts of methylene chloride and reacted with 78 parts (1.1 mole) of chlorine at a temperature between −60° and −55°C. t-Octyl mercaptan, 77.3 parts (0.53 mole), is then added with stirring, under nitrogen, at a temperature between −10° and −5°C. The addition time is ½ hour. Evolved hydrogen chloride is absorbed in a caustic trap as in Example 1.

When hydrogen chloride evolution has ceased, the methylene chloride solution is filtered and the methylene chloride is removed by evaporation to yield the desired disulfide which contains 32.65 percent sulfur, 8.44 percent nitrogen and 13.2 percent chlorine.

By similar methods, 1,2,4-thiadiazolyl disulfides derived from mercaptans such as 2-ethylhexyl, dodecyl, cyclohexyl, benzyl, β-naphthyl and the like may be prepared.

As previously indicated, the compounds of this invention are useful as corrosion inhibitors in lubricants. They can be employed in a variety of lubricating compositions based on diverse oils of lubricating viscosity, including natural and synthetic lubricating oils and mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present compounds.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkylbenzenes (e.g., dodecylbenzenes, tetradecylbenzenes, dinonylbenzenes, di-(2-ethylhexyl) benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether or polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl) silicate, tetra-(4-methyl-2-tetraethyl) silicate, tetra-(p-tert-butylphenyl) silicate, hexyl-(4-methyl-2-pentoxy)-disiloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

In general, about 0.05–20.0 parts (by weight) of the compound of this invention is dissolved in 100 parts of oil to produce a satisfactory lubricant. The invention also contemplates the use of other additives in combination with the products of this invention. Such additives include, for example, detergents and dispersants of the ash-containing or ashless type, oxidation inhibiting agents, pour point depressing agents, extreme pressure agents, color stabilizers and anti-foam agents.

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50°C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline, phenylenediamine, phenothiazine, phenyl-β-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60°–200°C.

Ashless detergents and dispersants are illustrated by the interpolymers of an oil-solubilizing monomer, e.g., decyl methacrylate, vinyl decyl ether, or high molecular weight olefin, with a monomer containing polar substituents, e.g., aminoalkyl acrylate or poly-(oxyethylene)-substituted acrylate; the amine salts, amides, and imides of oil-soluble monocarboxylic or dicarboxylic acids such as stearic acid, oleic acid, tall oil acid, and high molecular weight alkyl or alkenyl-substituted succinic acid. Especially useful as ashless detergents are the acylated polyamines and similar nitrogen compounds containing at least about 54 carbon atoms as described in U.S. Pat. No. 3,272,746; reaction products of such compounds with other reagents including boron compounds, phosphorus compounds, epoxides, aldehydes, organic acids and the like; and esters of hydrocarbon-substituted succinic acids as described in U.S. Pat. No. 3,381,022.

Extreme pressure agents, auxiliary corrosion-inhibiting agents, and oxidation-inhibiting agents are exemplified by chlorinated aliphatic hydrocarbons such as chlorinated wax; organic sulfides and polysulfides such as benzyl disulfide, bis(chlorobenzyl) disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phospite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(-heptylphenyl) phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

It is possible to form the lubricants of this invention by dissolving the various additives, or oil solutions thereof, directly in a mineral oil. However, it is generally more convenient and is preferred to prepare additive concentrates containing two or more of the desired additives, and to dissolve these concentrates in the mineral oil to form the final lubricating composition.

Typical lubricating compositions according to this invention are listed in the following table. All amounts listed, except those for mineral oil, are exclusive of oil present as diluent.

|  | Parts by weight | | | |
|---|---|---|---|---|
|  | A | B | C | D |
| SAE 10W-30 mineral oil base | 90.34 | 90.34 | 90.10 | 90.10 |
| Product of Example 1 | 0.50 | — | 0.10 | — |
| Product of Example 2 | — | 0.50 | — | 0.10 |
| Poly-(isodecyl acrylate) | 5.25 | 5.25 | 5.41 | 5.41 |
| Product obtained by esterifying polyisobutenyl succinic anhydride with pentaerythritol and neutralizing residual acidity with commercial mixture of polyethylene polyamines having 3-7 nitrogen atoms | 2.34 | 2.34 | 2.34 | 2.34 |
| Basic calcium alkylbenzenesulfonate | 0.74 | 0.74 | — | — |
| Basic magnesium alkylbenzenesulfonate | — | — | 1.22 | 1.22 |
| Silicone anti-foam agent | 0.004 | 0.004 | 0.004 | 0.004 |

What is claimed is:

1. A compound having the formula

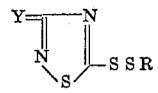

wherein R is a hydrocarbon radical containing 6–30 carbon atoms and Y is chlorine, bromine or SSR.

2. A compound according to claim 1 wherein Y is chlorine.

3. A compound according to claim 2 wherein R is an alkyl radical.

4. A compound according to claim 3 wherein R is the t-octyl radical.

5. A compound according to claim 1 wherein Y is SSR.

6. A compound according to claim 5 wherein R is an alkyl radical.

7. A compound according to claim 6 wherein R is the t-octyl radical.

* * * * *